United States Patent
Koo et al.

(10) Patent No.: US 12,537,239 B2
(45) Date of Patent: Jan. 27, 2026

(54) METHOD FOR REGENERATING LITHIUM PRECURSOR AND SYSTEM FOR REGENERATING LITHIUM PRECURSOR

(71) Applicant: SK INNOVATION CO., LTD., Seoul (KR)

(72) Inventors: Min Su Koo, Daejeon (KR); Hong Sik Kim, Daejeon (KR)

(73) Assignee: SK INNOVATION CO., LTD., Seoul (KR)

( * ) Notice: Subject to any disclaimer, the term of this patent is extended or adjusted under 35 U.S.C. 154(b) by 711 days.

(21) Appl. No.: 17/308,298

(22) Filed: May 5, 2021

(65) Prior Publication Data

US 2021/0273274 A1     Sep. 2, 2021

Related U.S. Application Data

(63) Continuation of application No. PCT/KR2019/011933, filed on Sep. 16, 2019.

(30) Foreign Application Priority Data

Nov. 7, 2018 (KR) .................. 10-2018-0136087

(51) Int. Cl.
*H01M 10/54* (2006.01)
*B09B 3/70* (2022.01)
*C01D 15/02* (2006.01)

(52) U.S. Cl.
CPC ............... *H01M 10/54* (2013.01); *B09B 3/70* (2022.01); *C01D 15/02* (2013.01); *C01P 2006/40* (2013.01)

(58) Field of Classification Search
None
See application file for complete search history.

(56) References Cited

U.S. PATENT DOCUMENTS

| 6,009,817 A | 1/2000 | Hanulik |
| 6,524,737 B1 | 2/2003 | Tanii et al. |
| 2019/0144294 A1 | 5/2019 | Song |

FOREIGN PATENT DOCUMENTS

| CN | 101117661 A | 2/2008 |
| CN | 103397127 A | 11/2013 |
| CN | 106129511 A | 11/2016 |
| CN | 106392095 A | 2/2017 |
| CN | 108034806 A | 5/2018 |
| CN | 108539309 A | 9/2018 |
| JP | S56236 A | 1/1981 |
| JP | 2000-348782 A | 12/2000 |

(Continued)

OTHER PUBLICATIONS

A machine generated translation for KR 20150094412 A (Year: 2015).*

(Continued)

*Primary Examiner* — Yun Qian
(74) *Attorney, Agent, or Firm* — The PL Law Group, PLLC

(57) ABSTRACT

In a method for regenerating a lithium precursor, an electrode active material mixture collected from a lithium secondary battery is prepared. The electrode active material mixture is reduced in a dry rotary heating reactor to form a preliminary precursor mixture. A lithium precursor is selectively recovered from the preliminary precursor mixture. Recovery yield and selectivity can be improved using the dry rotary heating reactor.

8 Claims, 1 Drawing Sheet

(56) References Cited

FOREIGN PATENT DOCUMENTS

| | | | |
|---|---|---|---|
| JP | 2004-011010 A | | 1/2004 |
| JP | 4105885 B2 | * | 6/2008 |
| JP | 2010-040458 A | | 2/2010 |
| JP | 2011-94227 A | | 5/2011 |
| JP | 2012-229481 A | | 11/2012 |
| JP | 2013-001990 A | | 1/2013 |
| JP | 2013-036717 A | | 2/2013 |
| JP | 2015-185471 A | | 10/2015 |
| JP | 2016-191143 A | | 11/2016 |
| JP | 2017-174517 A | | 9/2017 |
| JP | 2018-120716 A | | 8/2018 |
| JP | 2019-130474 A | | 8/2019 |
| KR | 10-1987-0003217 A | | 4/1987 |
| KR | 20130081772 | * | 7/2013 |
| KR | 2015-0094412 | * | 8/2015 |
| KR | 10-1623930 B1 | | 5/2016 |
| KR | 101682217 B1 | | 12/2016 |
| KR | 10-2017-0061206 A | | 6/2017 |
| KR | 10-1792753 B1 | | 11/2017 |
| KR | 10-1802071 B1 | | 11/2017 |
| KR | 10-1897134 B1 | | 9/2018 |
| WO | WO 2007/129845 A1 | | 11/2007 |
| WO | WO 2018/044251 A1 | | 3/2018 |

OTHER PUBLICATIONS

A machine generated translation for JP 4015885 B2 (Year: 2007).*
Park et al. (KR 20130081772 A) English translation (Year: 2013).*
European Search Report for EP19881173.9 issued on Jun. 9, 2022 from European patent office in a counterpart European patent application (all the cited references are listed in this IDS.).
International Search Report for PCT/KR2019/011933 mailed on Dec. 26, 2019.
Office action issued on Oct. 14, 2022 from China Patent Office in a counterpart China Patent Application No. 201980073218.0 (all the cited references are listed in this IDS.) (English translation is also submitted herewith.).
Office action issued on Oct. 3, 2023 from Japan Intellectual Property Office in a counterpart Japanese Patent Application No. 2021-524140 (all the cited references are listed in this IDS.) (English translation is also submitted herewith.).
Office action issued on Jul. 8, 2025 from Japan Intellectual Property Office in a counterpart Japanese Patent Application No. 2024-111045 (all the cited references are listed in this IDS.) (English translation is also submitted herewith.).

* cited by examiner

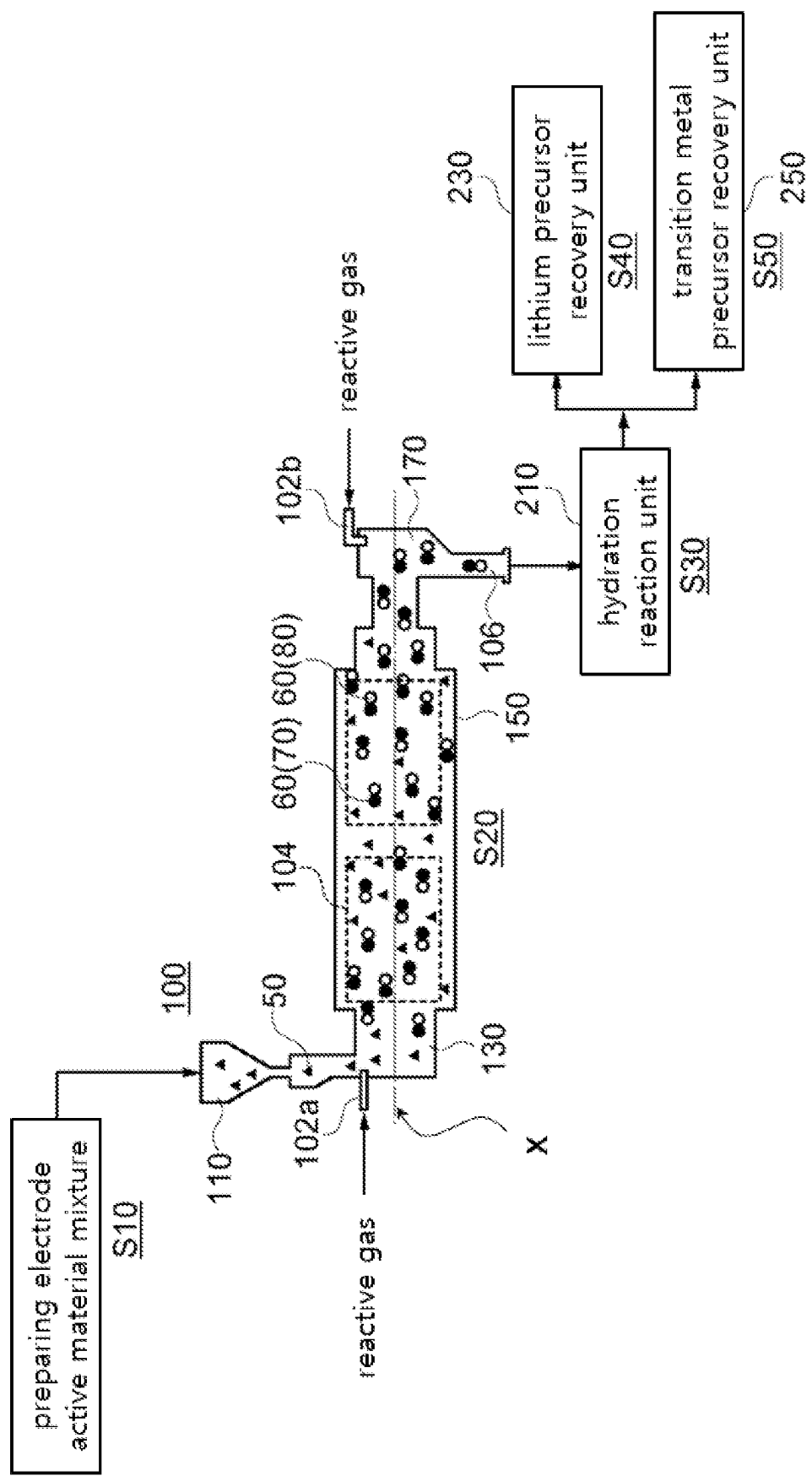

METHOD FOR REGENERATING LITHIUM PRECURSOR AND SYSTEM FOR REGENERATING LITHIUM PRECURSOR

CROSS REFERENCE TO RELATED APPLICATIONS AND CLAIM OF PRIORITY

The present application is a continuation application to International Application No. PCT/KR2019/011933 with an International Filing Date of Sep. 16, 2019, which claims the benefit of Korean Patent Application No. 10-2018-0136087 filed on Nov. 7, 2018 at the Korean Intellectual Property Office, the disclosures of which are incorporated by reference herein in their entirety.

BACKGROUND

1. Field

The present invention relates to a method for regenerating a lithium precursor and a system for regenerating a lithium precursor. More particularly, the present invention relates to a method and a system for regenerating a lithium precursor from a lithium secondary battery

2. Description of the Related Art

A secondary battery which can be charged and discharged repeatedly has been widely employed as a power source of a mobile electronic device such as a camcorder, a mobile phone, a laptop computer, etc., according to developments of information and display technologies. The secondary battery includes, e.g., a lithium secondary battery, a nickel-cadmium battery, a nickel-hydrogen battery, etc. The lithium secondary battery is actively developed and applied due to high operational voltage and energy density per unit weight, a high charging rate, a compact dimension, etc.

For example, the lithium secondary battery may include an electrode assembly including a cathode, an anode and a separation layer (a separator), and an electrolyte immersing the electrode assembly. The lithium secondary battery may further include an outer case having, e.g., a pouch shape for accommodating the electrode assembly and the electrolyte.

A lithium metal oxide may be used as a cathode active material of the lithium secondary battery. The lithium metal oxide may additionally contain a transition metal such as nickel, cobalt and manganese.

As the above-described high-cost valuable metals are used in the cathode active material, 20% or more of a total manufacture cost is required in a manufacture of the cathode active material. Additionally, as environmental protection issues have been recently highlighted, a recycling method of the cathode active material has been researched.

For example, a method of sequentially recovering valuable metals by leaching a waste cathode active material in a strong acid such as sulfuric acid is being researched. However, in the wet process as mentioned above, a washing process is required, and regeneration selectivity and efficiency may be degraded.

For example, Korean Registered Patent Publication No. 10-0709268 discloses an apparatus and a method for recycling a waste manganese battery and an alkaline battery, but fails to provide a sufficient method for regenerating valuable metals with high selectivity and low cost.

SUMMARY

According to an aspect of the present invention, there is provided a method for recovering an active metal of a lithium secondary battery with high efficiency and high purity.

According to an aspect of the present invention, there is provided a system for recovering an active metal of a lithium secondary battery with high efficiency and high purity.

In a method for regenerating a lithium precursor, an electrode active material mixture collected from a lithium secondary battery is prepared. The electrode active material mixture is reduced in a dry rotary heating reactor to form a preliminary precursor mixture. A lithium precursor is selectively recovered from the preliminary precursor mixture.

In exemplary embodiments, the preliminary precursor mixture may be formed by rotating the dry rotary heating reactor along an axis in a longitudinal direction while moving the electrode active material mixture in the longitudinal direction of the dry rotary heating reactor.

In exemplary embodiments, the dry rotary heating reactor may be rotated at a rate from 5 to 200 rpm along the axis in the longitudinal direction.

In exemplary embodiments, the preliminary precursor mixture may be formed by reacting the electrode active material mixture at a reaction temperature from 250 to 600° C.

In exemplary embodiments, the preliminary precursor mixture may be formed by contacting the electrode active material mixture with a reductive reaction gas.

In exemplary embodiments, the reductive reaction gas may be supplied from a rear end in a longitudinal direction of the dry rotary heating reactor to form a counter flow with respect to the electrode active material mixture supplied to a front end in the longitudinal direction of the dry rotary heating reactor.

In exemplary embodiments, the reductive reaction gas may be introduced together with the electrode active material mixture to a front end in the longitudinal direction of the dry rotary heating reactor.

In exemplary embodiments, the preliminary precursor mixture may include preliminary lithium precursor particles and transition metal-containing particles.

In exemplary embodiments, the lithium precursor may be recovered by collecting the preliminary lithium precursor particles before the transition metal-containing particles.

In exemplary embodiments, the preliminary lithium precursor particles may include lithium hydroxide, lithium oxide and lithium carbonate.

In exemplary embodiments, the lithium precursor may be recovered by hydrating the preliminary lithium precursor particles.

In exemplary embodiments, the preliminary lithium precursor may be hydrated to collect the lithium precursor before the transition metal-containing particles.

In exemplary embodiments, a transition metal precursor may be recovered by treating the transition metal-containing particles with an acid solution.

In exemplary embodiments, the dry rotary heating reactor may be an indirect firing rotary kiln.

A system for regenerating a lithium precursor according to exemplary embodiments includes an electrode active material mixture supply unit, a dry rotary heating reactor for reacting the electrode active material mixture supplied from the electrode active material mixture supply unit with a reductive gas, and a lithium precursor recovery unit for collecting a lithium precursor from a reaction product of the electrode active material mixture generated in the dry rotary heating reactor.

In exemplary embodiments, the system for regenerating a lithium precursor may further include a supply flow path connected to at least one of a front end or a rear end in a longitudinal direction of the dry rotary heating reactor to supply the reductive gas.

In exemplary embodiments, the system for regenerating a lithium precursor may further include a transition metal precursor recovery unit collecting a transition metal precursor from a reaction product of the electrode active material mixture.

According to the above-described exemplary embodiments, a lithium precursor may be recovered from an electrode active material mixture through a dry-based process using a dry rotary heating reactor. Thus, the lithium precursor may be recovered with high purity without a need for an additional process resulting from a wet-based process.

Further, a reaction time, a residence time and a reaction degree of reaction between the electrode active material mixture and a reductive reaction gas may be easily controlled by adjusting a rotation speed of the dry rotary heating reactor, a reaction temperature and a moving distance in a longitudinal direction of a reactant. Thus, selectivity and efficiency of a lithium precursor regenerating process may be further improved.

Additionally, by using a dry rotary indirect heating reactor, a reactor body may be indirectly heated through a jacket or an electric furnace in the indirect heating reactor without generation of combusted materials. Accordingly, contamination of a preliminary precursor mixture by the combusted materials may be prevented to achieve the lithium precursor of high purity without the need for the additional process.

BRIEF DESCRIPTION OF THE DRAWING

FIG. 1 is a process flow diagram illustrating a method of regenerating a lithium precursor in accordance with exemplary embodiments.

DETAILED DESCRIPTION OF THE EMBODIMENTS

According to exemplary embodiments of the present invention, there is provided a dry-based method of regeneration an active metal from a lithium secondary battery using a dry rotary heating reactor (rotary kiln) with high purity and yield.

Hereinafter, embodiments of the present invention will be described in detail with reference to the accompanying drawings. However, the embodiments are provided as exemplary examples, and the spirit of the present invention are not limited to those specific embodiments.

The term "precursor" in the present specification is used to generically refer to a compound containing a specific metal to provide the specific metal included in an electrode active material.

FIG. 1 is a schematic flow diagram illustrating a method of regenerating a lithium precursor in accordance with exemplary embodiments. For convenience of descriptions, FIG. 1 also includes a schematic view of a dry rotary heating reactor together with a process flow diagram.

Referring to FIG. 1, an electrode active material mixture 50 may be prepared from a lithium secondary battery (e.g., in a step of S10). In exemplary embodiments, the electrode active material mixture 50 may be prepared from an electrode obtained from a lithium secondary battery. For example, the electrode active material mixture 50 may be prepared from a lithium-containing compound obtained from a lithium secondary battery.

The term "electrode active material mixture" used herein may refer to a raw material introduced into a dry rotary heating reactor to be described later after cathode and anode current collectors are substantially removed from electrodes recovered from the lithium secondary battery.

The electrode active material mixture 50 may be a mixture of materials obtained from the lithium secondary battery including a cathode active material mixture. Preferably, the electrode active material mixture 50 may be the cathode active material mixture. Hereinafter, a case where the electrode active material mixture 50 is the cathode active material mixture will be described in detail, but this case is provided as an example and the present invention is not limited thereto.

The lithium secondary battery may include an electrode assembly including an electrode including a cathode and an anode, and a separation layer interposed between the cathode and the anode. The cathode and the anode may each include a cathode active material layer and an anode active material layer coated on a cathode current collector and an anode current collector, respectively.

For example, a cathode active material included in the cathode active material layer may include an oxide containing lithium and a transition metal.

In some embodiments, the cathode active material may include a compound represented by Chemical Formula 1 below.

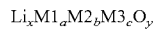  [Chemical Formula 1]

In Chemical Formula 1, M1, M2 and M3 may each be an element selected from Ni, Co, Mn, Na, Mg, Ca, Ti, V, Cr, Cu, Zn, Ge, Sr, Ag, Ba, Zr, Nb, Mo, Al, Ga or B. In Chemical Formula 1, 0<x≤1.1, 2≤y≤2.02, 0<a<1, 0<b<1, 0<c<1, and 0<a+b+c≤1.

In some embodiments, the cathode active material may be an NCM-based lithium oxide containing nickel, cobalt and manganese. The NCM-based lithium oxide as the cathode active material may be prepared by reacting a lithium precursor and an NCM precursor (e.g., an NCM oxide) with each other through, e.g., a co-precipitation reaction.

However, embodiments of the present invention may be commonly applied not only to the electrode material including the NCM-based lithium oxide, but also to the lithium-containing electrode material.

The lithium precursor may include lithium hydroxide (LiOH), lithium oxide ($Li_2O$) or lithium carbonate ($Li_2CO_3$). Lithium hydroxide may be advantageous as a lithium precursor in an aspect of a charge/discharge property, a lifespan property, a high temperature stability, etc., of a lithium secondary battery. For example, lithium carbonate may cause an immersion reaction on the separation layer, thereby reducing life-span stability.

Accordingly, according to embodiments of the present invention, a method of regenerating lithium hydroxide as a lithium precursor with a high selectivity may be provided.

For example, the cathode may be separated and recovered from the lithium secondary battery. The cathode may include the cathode current collector (e.g., aluminum (Al)) and the cathode active material layer, and the cathode may include a conductive agent and a binder together with the above-described cathode active material.

The conductive agent may include, e.g., a carbon-based material such as graphite, carbon black, graphene, carbon nanotube, etc. The binder may include a resin, e.g., vinylidene fluoride-hexafluoropropylene copolymer (PVDF-co-HFP), polyvinylidene fluoride (PVDF), polyacrylonitrile, polymethyl methacrylate, etc.

The cathode active material mixture may be prepared from the recovered cathode. In some embodiments, the cathode active material mixture may be prepared in a powder form through a physical method such as a grinding treatment. The cathode active material mixture may include a powder of a lithium-transition metal oxide, and may include, e.g., an NCM-based lithium oxide powder (e.g., Li(NCM)$O_2$).

The term "cathode active material mixture" used in the present application may refer to a raw material introduced into the dry rotary heating reactor to be described later after the cathode current collector is substantially removed from the recovered cathode.

In an embodiment, the cathode active material mixture may include cathode active material particles such as the NCM-based lithium oxide. In an embodiment, the cathode active material mixture may include some components derived from the binder or the conductive agent. In an embodiment, the cathode active material mixture may essentially consist of the cathode active material particles.

In some embodiments, an average particle diameter (D50) of the cathode active material mixture may be from 5 to 100 μm. Within the above range, the lithium-transition metal oxide such as Li(NCM)$O_2$ may be easily separated from the cathode current collector, the conductive agent and the binder contained in the cathode active material mixture.

In some embodiments, the cathode active material mixture may be heat-treated before being introduced into the dry rotary heating reactor to be described later. Impurities such as the conductive agent and the binder included in the cathode active material mixture may be removed or reduced by the heat treatment so that the lithium-transition metal oxide may be introduced into the dry rotary heating reactor with high purity.

For example, the heat treatment may be performed at a temperature from about 100 to 500° C., preferably from about 350 to 450° C. Within the above range, decomposition and damage of the lithium-transition metal oxide may be prevented while substantially removing the impurities.

In some embodiments, the cathode active material mixture may be obtained after immersing the recovered cathode in an organic solvent. For example, the recovered cathode may be immersed in an organic solvent to separate and remove the cathode current collector, and the cathode active material may be selectively extracted by a centrifugation.

By the above-described processes, the cathode current collector component such as aluminum may be substantially completely separated and removed, and the cathode active material mixture from which a content of carbon-based components derived from the conductive agent and the binder may be removed or reduced may be obtained.

The process of obtaining the cathode active material mixture has been described in detail above. As described above, the electrode active material mixture 50 may include the above-described cathode active material mixture, and may further include an anode active material mixture in addition to the above-described cathode active material mixture.

For example, in an operation of S20, the electrode active material mixture 50 may be reacted in the dry rotary heating reactor 100 to form a preliminary precursor mixture 60.

As illustrated in FIG. 1, the dry rotary heating reactor 100 may be divided into a reactor body 150, a reactor front end 130 and a reactor rear end 170. The reactor body 150 may include a heating unit 104 such as a heater or an electric furnace.

The electrode active material mixture 50 may be supplied to the reactor front end 130 through an electrode active material mixture supply unit 110. The electrode active material mixture 50 may be moved into the reactor body 150 through the reactor front end 130.

A reactive gas may be supplied into the reactor body 150 through a first supply flow path 102a connected to the reactor front end 130 or a second supply flow path 102b connected to the reactor rear end 170 to convert the electrode active material mixture 50 into a preliminary precursor. In exemplary embodiments, the reactive gas may include a reductive gas, e.g., hydrogen ($H_2$). The reactive gas may contact the electrode active material mixture 50 to reduce the electrode active material mixture 50 to the preliminary precursor mixture 60.

When the reactive gas is supplied into the reactor body 150 through the second supply flow path 102b connected to the rear end 170 of the dry rotary heating reactor 100, the reactive gas may contact the electrode active material mixture 50 injected through the electrode active material mixture supply unit 110 connected to the front end 130 of the dry rotary heating reactor 100, so that a counter flow of the electrode active material mixture 50 and the reactive gas may be created. A non-reacted portion of the electrode active material mixture 50 and the reactive gas with high purity may contact each other by the counter flow so that a reaction conversion rate may be enhanced.

When the reactive gas is supplied into the reactor body 150 through the first supply flow path 102a connected to the front end 170 of the dry rotary heating reactor 100, the reactive gas may contact the electrode active material mixture 50 injected through the electrode active material mixture supply unit 110 connected to the front end 130 of the dry rotary heating reactor 100, so that a co-flow of the electrode active material mixture 50 and the reactive gas may be created. A contact time of the electrode active material mixture 50 and the reactive gas may be increased by the co-flow so that a selectivity and an efficiency of the reductive reaction between the electrode active material mixture 50 and the reactive gas may be improved. Further, the electrode active material mixture 50 with high concentration and the reactive gas may contact each other so that an initial reductive reaction rate may be increased, and the electrode active material mixture 50 and the reactive gas may rapidly pass through the dry rotary heating reactor 100 to shorten an overall process time.

In some embodiments, the electrode active material mixture 50 may be reduced by the reactive gas including the hydrogen gas to form the preliminary precursor mixture 60. For example, the preliminary precursor mixture 60 may include preliminary lithium precursor particles 70 including lithium oxide (e.g., $Li_2O$) and transition metal-containing particles 80 including a transition metal or transition metal oxide. For example, Ni, Co, Mn, NiO, CoO and MnO may be generated together with the lithium oxide by the reductive reaction.

The reactor body 150 may include the heating unit 104. The heating unit 104 may be at least one selected from the group consisting of a heater, a burner, a jacket and an electric furnace. Preferably, the heating unit may be the jacket or the electric furnace. The heating unit 104 may be located within the reactor body 150 and may exist as an individual structure or may be integrated with the reactor body 150.

The heating unit 104 may heat the reactor body 150 to a temperature from about 250 to 600° C., preferably from about 350 to 450° C. The reductive reaction may be performed within the above temperature range. Within the above reaction temperature range, the reductive reaction between the electrode active material mixture 50 and the reactive gas may be promoted. If the temperature of the reactor body 150 is less than 350° C., the reductive reaction may not proceed sufficiently. If the temperature of the reactor body 150 exceeds 450° C., an unnecessary heat may be supplied excessively without promoting the reductive reaction, thereby deteriorating a productivity of the reductive process.

The dry rotary heating reactor may be an indirect firing rotary kiln. The indirect heating rotary reactor may increase the temperature of the reactor body 150 through the jacket or the electric furnace. The indirect firing rotary kiln indirectly heats the reactor body 150 through a heat conduction by the jacket, the electric furnace, etc. The reactor body 150 may be indirectly heated by the indirect firing rotary kiln so that combusted materials may not be generated while heating the reactor body 150 and the preliminary precursor mixture may be prevented from being contaminated by the combusted materials. The lithium precursor with high purity may be easily obtained using the indirect firing rotary kiln without an additional process for removing the combusted materials When referring to FIG. 1, the dry rotary heating reactor 100 may be rotated along an axis X in a longitudinal direction of the dry rotary heating reactor 100 which may be a moving direction of the electrode active material mixture 50. For example, in the dry rotary heating reactor 100, the reactor body 150 may be rotated along the axis X in the longitudinal direction of the dry rotary heating reactor 100. The dry rotary heating reactor 100 may rotate along the longitudinal axis X to increase the contact between the electrode active material mixture 50 and the reactive gas, thereby promoting a reductive reaction. Further, an agglomeration between the preliminary precursor mixtures 60 formed by the reductive reaction of the electrode active material mixture 50 and the reactive gas may be prevented.

The dry rotary heating reactor 100 may rotate at a rate from 5 to 200 rpm along the axis X in the longitudinal direction in which the electrode active material mixture 50 moves. Within the above rotation speed range, the aggregation between the preliminary precursor mixtures 60 formed by the reductive reaction of the electrode active material mixture 50 and the reactive gas may be effectively prevented, and the preliminary precursor mixtures 60 may be prevented from being deposited on an inner surface of the reactor body 150. If the rotational speed of the dry rotary heating reactor 100 is less than 5 rpm, a contact ratio between the electrode active material mixture 50 and the reactive gas may decrease, and thus the reaction may not proceed sufficiently. If the rotational speed of the dry rotary heating reactor 100 exceeds 200 rpm, reactants may be deposited on the inner surface of the reactor body 150 by a centrifugal force, and a moving rate of the electrode active material mixture 50 may increase to cause a discharge of the electrode active material mixture 50 in a non-reacted state that may not be reduced.

When referring to FIG. 1, a length of the reactor body 150 may be adjusted to control a moving distance of the electrode active material mixture 50 within the reactor body 150. Accordingly, a residence time during which the electrode active material mixture 50 and the reactive gas are present in the reactor body 150 and a total reaction time may be controlled.

The length of the reactor body 150 may be from 1 to 60 m. If the length of the reactor body 150 is less than 1 m, the reductive reaction between the electrode active material mixture 50 and the reactive gas may not proceed sufficiently. If the length of the reactor body 150 exceeds 60 m, the preliminary precursor mixture 60 formed by a completion of the reductive reaction may excessively reside in the reactor body 150, thereby degrading a process efficiency. Further, the aggregation between the preliminary precursor mixtures 60 may occur while the preliminary precursor mixture 60 moves within the reactor body 150.

The preliminary precursor mixture 60 including the preliminary lithium precursor particles 70 and the transition metal-containing particles 80 (e.g., the transition metal or the transition metal oxide) may be formed in the reactor body 150. The preliminary lithium precursor particles 70 may include, e.g., lithium hydroxide, lithium oxide and/or lithium carbonate.

When referring to FIG. 1, the preliminary precursor mixture 60 including the preliminary lithium precursor particles 70 and the transition metal-containing particles 80 may be collected through an outlet 106 connected to the reactor rear end 170.

The preliminary precursor mixture 60 collected through the outlet 106 may be injected into a hydration reaction unit 210, and a hydration reaction between the preliminary precursor mixture 60 and water may be induced in the hydration reaction unit 210 (e.g., in an operation of S30).

In exemplary embodiments, the preliminary lithium precursor particles 70 may be hydrated with water in the hydration reaction unit 210 to recover lithium hydroxide (e.g., LiOH) as a lithium precursor. A crystallized lithium precursor may be obtained through the hydration reaction.

The lithium precursor formed in the hydration reaction unit 210 may be recovered in a lithium precursor recovery unit 230 (e.g., in an operation of S40).

The transition metal-containing particles 80 including nickel, cobalt or manganese may be relatively heavier than the lithium precursor particles, and thus the lithium precursor particles may be collected in advance. The lithium precursor particles may be firstly collected, and the lithium precursor particles may be separated without an additional separation process, so that efficiency, productivity and selectivity of the lithium precursor may be improved.

In a comparative example, a wet process such as a leaching process using a strong acid may be used to recover lithium or a transition metal from a lithium secondary battery. However, in the case of the wet process, a selective separation of lithium may be limited. Further, a washing process is required to remove a solution residue, and by-products such as hydrate may increase due to a contact with a solution.

However, according to embodiments of the present invention, the preliminary precursor mixture 60 may be collected using a dry process from which the use of a solution is excluded, and the lithium precursor may be separated through the hydration reaction from which the use of a strong acid is excluded. Thus, by-products may be reduced and a production yield may be improved, and an eco-friendly process design may be available without a waste water treatment.

Additionally, the lithium precursor particles may be selectively recovered before the transition metal-containing particles 80 through the hydration reaction unit 210, so that selectivity, yield and purity of the lithium precursor may be further improved.

Further, the dry rotary heating reactor 100 may control or promote the reaction rate of the electrode active material mixture 50 and the reactive gas by adjusting a rotation speed of the reactor, the length of the reactor body 150 and the temperature in the reactor body, etc., so that selectivity, yield and purity of the lithium precursor may be further improved.

In some embodiments, after recovering the lithium precursor from the hydration reaction unit 210, the transition metal-containing particles 80 may be collected by the transition metal precursor recovery unit 250. A transition metal precursor may be obtained from the transition metal-containing particles 80 collected from the transition metal precursor recovery unit 250 (e.g., in an operation of S50).

For example, the preliminary lithium precursor particles 70 may be collected through the outlet 106, and then the transition metal-containing particles 80 may be recovered through the hydration reaction unit 210. Thereafter, the transition metal-containing particles 80 may be treated with an acid solution to form precursors in the form of acid salts of each transition metal.

In an embodiment, sulfuric acid may be used as the acid solution. In this case, $NiSO_4$, $MnSO_4$ and $CoSO_4$ may be recovered as the transition metal precursors, respectively.

As described above, after collecting the lithium precursor through a dry process and a hydration reaction, the transition metal precursors may be selectively extracted using the acid solution, so that the purity and selectivity of each metal precursor may be improved, and a load of a wet process may be reduced to also reduce amounts of wastewater and by-products.

What is claimed is:

1. A method for regenerating a lithium precursor, the method comprising:
    preparing an electrode active material mixture collected from a lithium secondary battery;
    forming a preliminary precursor mixture by reducing the electrode active material mixture in an indirect firing rotary kiln; and
    selectively recovering a lithium precursor from the preliminary precursor mixture,
    wherein the forming of the preliminary precursor mixture comprises contacting the electrode active material mixture with a reductive reaction gas which is supplied from both a rear end and a front end longitudinal direction of the indirect firing rotary kiln,
    the reductive reaction gas supplied from the rear end in a longitudinal direction of the indirect firing rotary kiln forms a counter flow with respect to the electrode active material mixture supplied to the front end in the longitudinal direction of the indirect firing rotary kiln, and
    the reductive reaction gas supplied from the front end in the longitudinal direction of the indirect firing rotary kiln forms a co-flow with respect to the electrode active material mixture supplied to the front end in the longitudinal direction of the indirect firing rotary kiln,
    wherein the forming of the preliminary precursor mixture comprises rotating the indirect firing rotary kiln at a rate from 5 to 200 rpm along an axis in a longitudinal direction while moving the electrode active material mixture in the longitudinal direction of the indirect firing rotary kiln.

2. The method of claim 1, wherein the reductive reaction gas is introduced together with the electrode active material mixture to the front end in the longitudinal direction of the indirect firing rotary kiln.

3. The method of claim 1, wherein the preliminary precursor mixture comprises preliminary lithium precursor particles and transition metal-containing particles.

4. The method of claim 3, wherein the preliminary lithium precursor particles include lithium hydroxide, lithium oxide and lithium carbonate.

5. The method of claim 3, further comprising recovering a transition metal precursor by treating the transition metal-containing particles with an acid solution.

6. The method of claim 1, wherein the selectively recovering of the lithium precursor comprises hydrating the preliminary lithium precursor particles to generate the lithium precursor and recovering the generated lithium precursor.

7. The method of claim 6, wherein the hydrating of the preliminary lithium precursor particles comprises collecting the lithium precursor before the transition metal-containing particles.

8. A method for regenerating a lithium precursor, the method comprising:
    preparing an electrode active material mixture collected from a lithium secondary battery;
    forming a preliminary precursor mixture by reducing the electrode active material mixture in an indirect firing rotary kiln; and
    selectively recovering a lithium precursor from the preliminary precursor mixture,
    wherein the forming of the preliminary precursor mixture comprises contacting the electrode active material mixture with a reductive reaction gas which is supplied from both a rear end and a front end longitudinal direction of the indirect firing rotary kiln,
    the reductive reaction gas supplied from the rear end in a longitudinal direction of the indirect firing rotary kiln forms a counter flow with respect to the electrode active material mixture supplied to the front end in the longitudinal direction of the indirect firing rotary kiln, and
    the reductive reaction gas supplied from the front end in the longitudinal direction of the indirect firing rotary kiln forms a co-flow with respect to the electrode active material mixture supplied to the front end in the longitudinal direction of the indirect firing rotary kiln,
    wherein the forming of the preliminary precursor mixture is performed at a reaction temperature from 250 to 600° C.

* * * * *